United States Patent [19]
McDonald

[11] Patent Number: 4,676,529
[45] Date of Patent: Jun. 30, 1987

[54] PIPE JOINT

[75] Inventor: Patrick E. McDonald, Houston, Tex.

[73] Assignee: Hydril Company, Houston, Tex.

[21] Appl. No.: 843,385

[22] Filed: Mar. 24, 1986

[51] Int. Cl.[4] .............................................. F16L 55/00
[52] U.S. Cl. ...................................... 285/92; 285/334; 285/350; 285/382
[58] Field of Search ............... 285/334, 333, 355, 350, 285/390, 382, 92

[56] References Cited

U.S. PATENT DOCUMENTS 3,489,437  1/1970  Duret .............................. 285/334 X
4,192,533  2/1980  Blose .............................. 285/355 X Primary Examiner—Richard J. Scanlan, Jr.
Attorney, Agent, or Firm—Vaden, Eickenroht, Thompson & Boulware

[57] ABSTRACT

A pipe joint of the free-running thread type is provided with engaging shoulders on the pin and box that are positioned for the metal adjacent the shoulders to be stressed by make-up torque beyond its yield joint and extruded laterally of the shoulders into grooves to mechanically lock the joint in its made-up position.

7 Claims, 5 Drawing Figures

PIPE JOINT

This invention relates generally to a pipe joint for use with oil country tubular goods, and, in particular to a pipe joint having free running threads.

Threaded joints of the type that use cylindrical or tapered threads of a modified buttress type are designed to provide clearance between the flanks of the threads to allow the joints to be made-up with little torque required until the sealing and shouldering surfaces engage. There may be just one pair of shoulders that not only act as torque shoulders to limit the distance the pin can move into the box, but also define sealing surfaces to effect sealing of the joint. Alternatively, there may be two or more pairs of engaging surfaces where one or more act to seal the joint and one or more act as torque or stop shoulders. Or the joint may have two sets of engaging sealing surfaces and separate torque shoulders that can also provide a seal.

In any event, after the joint is made-up hand-tight, the torque required to completely make-up the joint serves to force the sealing and/or shouldering surfaces of the joint together. The normal forces developed between the surfaces and the threads create the friction that resists conditions or forces tending to cause the connection to unscrew. As the frictional force between the box pin is increased, the back off torque required to loosen the connection is also increased. Means for improving locking of the pin and box in the fully made-up position will enhance the sealing characteristics of the connection by reducing the probability of inadvertent back off.

Therefore, it is an object of this invention to provide an improved pipe joint having threads of the free-running type described above that will lock the pin and box against relative rotation when the joint is made-up.

It is another object of this invention to provide an improved pipe joint of the type described above and a tubular member having threads for forming the pipe joint that includes a cavity on either the box or pin or on both into which a portion of the other member is extruded when the joint is made-up to form interlocking surfaces that prevent relative rotation between the two members, and thereby lock the pin and box in the fully made-up position.

It is another object of this invention to provide an improved pipe joint of the type described above in which the box and pin have engaging shoulders positioned to stress the metal adjacent the shoulders beyond the yield point and extrude the metal laterally of the shoulders into adjacent cavities in the box and pin to lock the box and pin from relative rotation.

These and other objects, advantages, and features of this invention will become apparent to those skilled in the art from a consideration of this specification, including the attached drawings and appended claims.

While the following description primarily uses the well known, free-running two-step, non-tapered, shouldered connections of the Hydril Company to illustrate the features of the invention, it will be understood that the invention described herein can be used with any type threaded connection having engaging shoulders where it is desirable to lock the pin and box together to resist relative rotation when the joint is made-up, such as in a pipe line.

Figure 1:
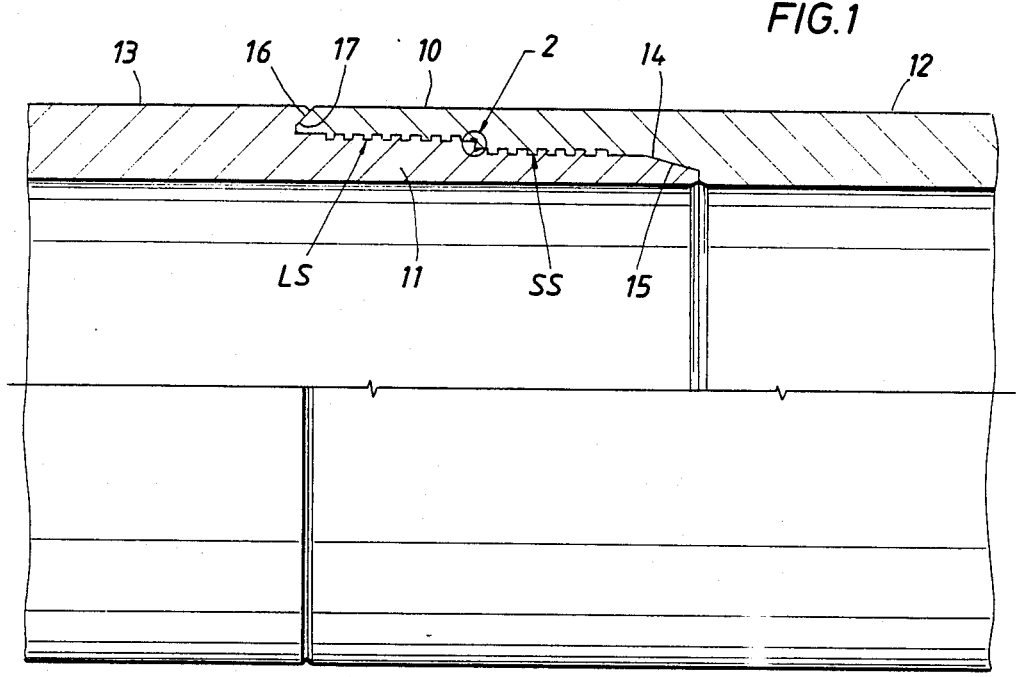
FIG. 1 is a partial longitudinal cross-section of a typical pipe joint having free-running threads embodying the improvement of this invention.

The pipe joint shown in FIG. 1 includes box 10 and pin 11. The box and pin are formed on the ends of tubular members 12 and 13, respectively. The box has internal threads and the pin has external threads that mate with the threads on the box to allow the pin to be screwed into the box to make up the joint and connect the tubular members. In this joint, the threads are straight or cylindrical and they are stepped so that half of the threads have a smaller major and minor diameter than the other threads. The threads are shown in the drawing as being square, but in practice they are usually a modified buttress type, well known to those skilled in the art.

When made-up as shown in FIG. 1, conical sealing surface 14 on the end of pin 11 engages conical sealing surface 15 at the base of the box. Usually these sealing surfaces have about a 14° taper. At the upper end of box 10, conical sealing surface 16 is in sealing engagement with matching conical sealing surface 17 on pin 11. In the joint shown, sealing surfaces 16 and 17 are tapered at about 60° from the longitudinal axis of the joint.

As previously discussed, the metal-to-metal seal between these surfaces is lost with only a small degree of relative rotation of the box and pin. To prevent the pin and box from backing off, the present invention provides means for locking the pipe joint in a made-up condition.

In the embodiment shown, both the pin and box have annular shoulders located between the large step threads (LS) and the small step threads (SS) that engage as the joint is made-up. These shoulders and the adjacent portions of the box and pin are shown on an enlarged scale in FIGS. 2A and 2B.

Engaging shoulder 24 of box 10 and shoulder 26 of pin 11 are tapered along a plane that intersects the longitudinal axis of the pipe joint at an acute angle to provide the shoulders with frusto-conical mating surfaces. Preferably, the angle of inclination is between 75° and 90°. The angles of taper of the shoulders do not need to be the same, particularly if the mismatch will provide force components that urge the extruded metal to move in the desired direction.

Figure 2A:
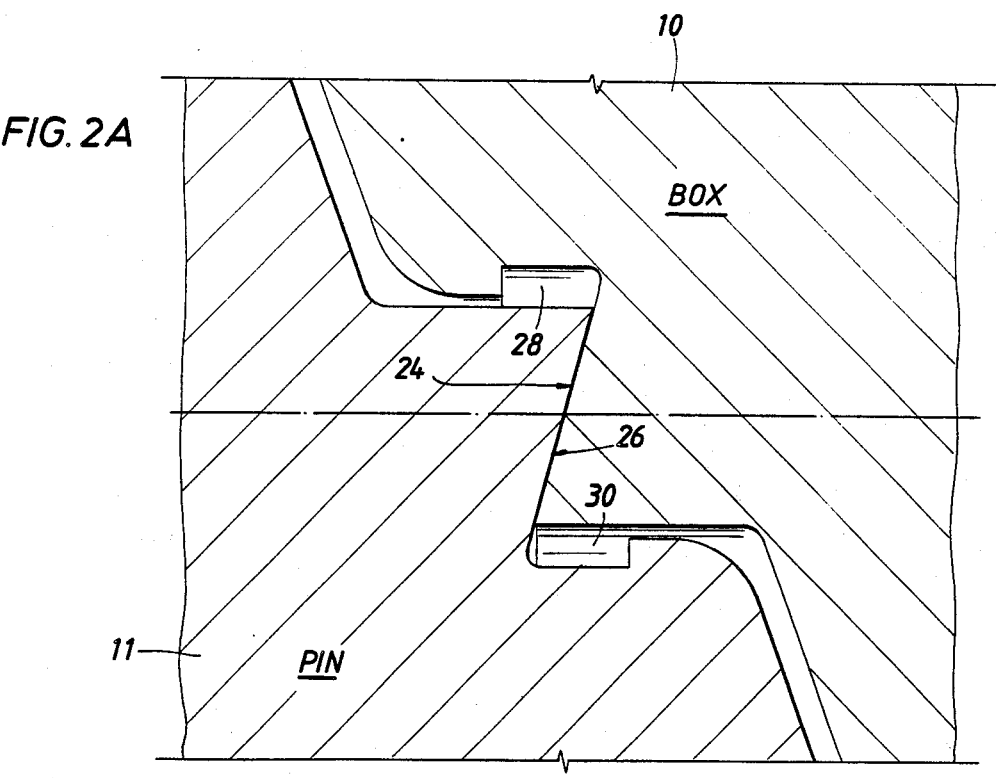
FIG. 2A is a sectional view of an enlarged scale of the portion of the joint of FIG. 1 within circle 2 when the joint is hand-tight.
Figure 2B:
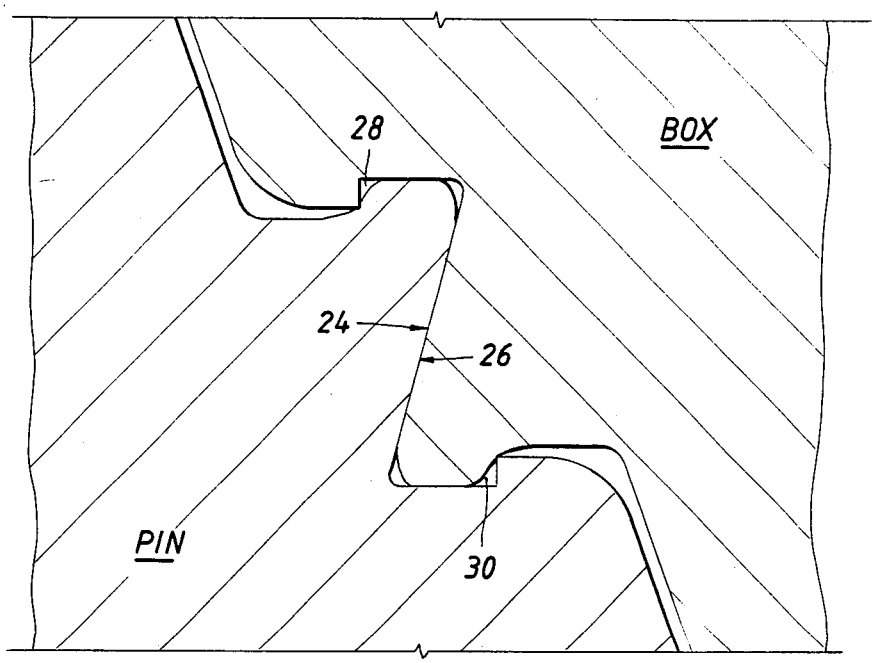
FIG. 2B is the same view as FIG. 2A after the joint is made-up.

Annular grooves 28 and 30 are located in the box and pin, respectively, on opposite sides of engaging shoulders 24 and 26. The shoulders are positioned so that they engage, as shown in FIG. 2A, before the joint is made-up so that make-up torque will create stress in the box and pin adjacent the shoulders that exceed the yield point of the metal from which the pin and box are made. As the metal yields, it will extrude laterally of the normal force between the two shoulders, i.e., the metal of the box adjacent shoulder 24 will extrude into cavity 30 and the metal of the pin adjacent shoulder 26 will extrude into cavity 28 as shown in FIG. 2B. Since any relative rotation between the box and pin tending to loosen the joint requires relative longitudinal movement of the box and pin and such longitudinal movement is prevented by the interlocking surfaces of the grooves and the extruded metal, the joint is effectively locked in the fully made up position.

Figure 3A:
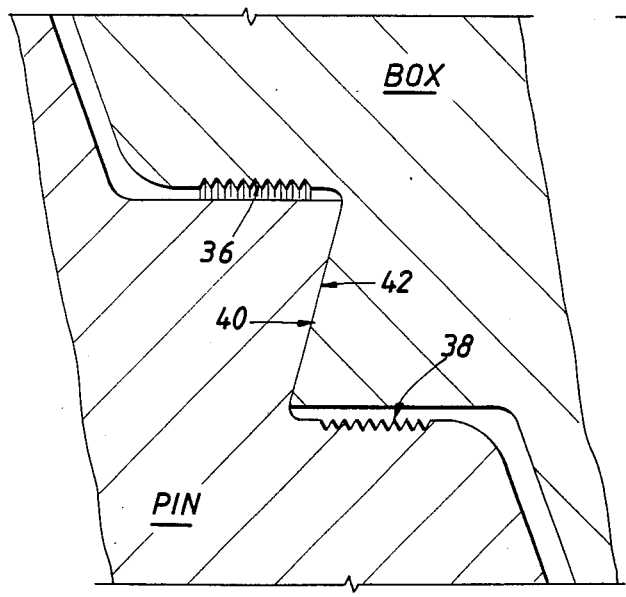
FIGS. 3A and 3B are views similar to FIGS. 2A and 2B of an alternate embodiment of the invention.
Figure 3B:
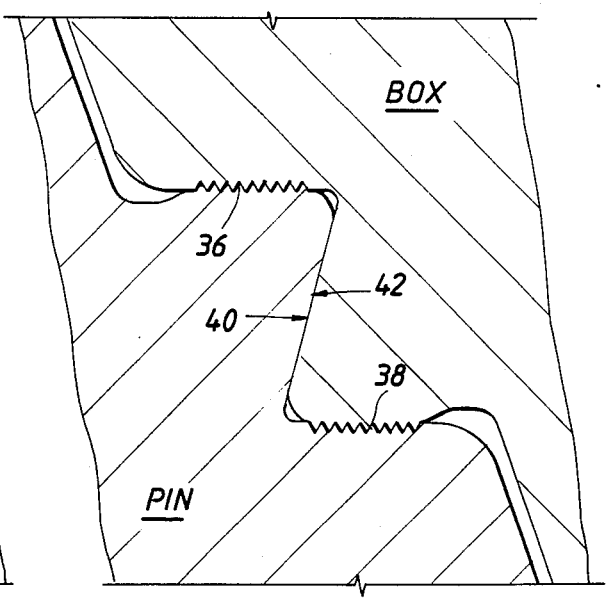

In the alternate embodiment shown in FIGS. 3A and 3B, a plurality of side by side annular cavities form knurled surfaces 36 and 38 on the box and pin, on opposite sides of engaging surfaces 40 and 42. The extruded metal is forced into the cavities and lock the pin and box against relative rotation as shown in FIG. 3B when the joint is made up.

From the foregoing it will be seen that this invention is one well adapted to attain all of the ends and objects hereinabove set forth, together with other advantages that are obvious and that are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A metal pipe joint comprising a box having internal threads and a pin having external threads for mating with the internal threads of the box to make-up the joint, a shoulder on the box and a shoulder on the pipe for engaging the shoulder on the box as the joint is made up with sufficient force to extrude the metal of one of the box and pin laterally, and a cavity in the other of the box and pin positioned to receive the extruded metal and form interlocking surfaces between the extruded metal and the cavity wall to hold the box and pin from relative rotation.

2. The pipe joint of claim 1 in which one of the shoulders is frusto-conical.

3. The pipe joint of claim 2 in which both shoulders are frusto-conical.

4. The pipe joint of claims 1, 2 or 3 in which the cavity is one of a plurality of cavities forming a knurled surface.

5. For use in forming a pipe joint, a threaded tubular member adapted for connecting to another threaded member to form a threaded connection between the two members, comprising a tubular body, free running screw threads on the body, a cavity on the body and a shoulder on the body adjacent the cavity to engage a shoulder on the other threaded member that is positioned when the threaded member is connected to the other threaded member for a portion thereof to be extruded into the cavity to engage at least one of the walls of the cavity and prevent relative rotational between the members after they are connected.

6. The threaded tubular member of claim 5 in which the shoulder lies in a plane that intersects the longitudinal axis of the member at an acute angle.

7. The threaded tubular member of claims 5 or 6, in which the threads of the member are straight and are divided into a large step and a small step having a major diameter and a minor diameter smaller than the major and minor diameters of the large step and in which the shoulder is located between the large and small step.

* * * * *